(12) United States Patent
Linzer et al.

(10) Patent No.: US 6,229,850 B1
(45) Date of Patent: May 8, 2001

(54) MULTIPLE RESOLUTION VIDEO COMPRESSION

(75) Inventors: Elliot N. Linzer, Bronx; Aaron Wells, New Rochelle, both of NY (US)

(73) Assignee: C-Cube Semiconductor II, Inc., Milpitas, CA (US)

(*) Notice: Subject to any disclaimer, the term of this patent is extended or adjusted under 35 U.S.C. 154(b) by 0 days.

(21) Appl. No.: 09/421,178

(22) Filed: Oct. 19, 1999

Related U.S. Application Data

(62) Division of application No. 08/999,763, filed on Jul. 22, 1997, now Pat. No. 6,005,621.

(51) Int. Cl.⁷ .................................................. H04N 7/12
(52) U.S. Cl. ................. 375/240.11; 375/240.1
(58) Field of Search .................................. 348/397–399, 348/385, 387–389, 437–438, 426, 441, 445–446, 448, 458–459, 408, 437.1, 438.1; 382/240; 386/111; 375/240.1, 240.11, 240.19, 240.25, 240

(56) References Cited

U.S. PATENT DOCUMENTS

| | | | |
|---|---|---|---|
| 4,780,760 | * 10/1988 | Waldman et al. | 348/397 |
| 5,048,111 | 9/1991 | Jones et al. | 348/384 |
| 5,173,773 | 12/1992 | Ueda et al. | 348/407 |
| 5,270,813 | 12/1993 | Puri et al. | 348/415 |
| 5,469,212 | 11/1995 | Lee | 348/412 |

(List continued on next page.)

OTHER PUBLICATIONS

"Switching Facilities in MPEG–2: Necessary But Not sufficient", S. Merrill Weiss, SMPTE Journal, Dec. 1995, pp. 788–802.

"Balancing act: Digital ad insertion over multipe zones", R. James Kelso, Communications Technology, May 1995, pp. 68–76.

"Advantages of digital ad insertion", Chris Brechin, Communications Technology, May 1995, pp. 50–54.

"Ad insertion system architecture", Thomas A. Walsh, Communications Technology, May 1995, pp. 56–66.

(List continued on next page.)

Primary Examiner—Vu Le
(74) Attorney, Agent, or Firm—Proskauer Rose, LLP

(57) ABSTRACT

An apparatus and method for compressing multiple resolution versions of a video signal are disclosed. A first resolution version of a video signal is applied to an input of a first video compressor and to an input of a video scaler. The first video compressor encodes the first resolution version of the video signal to generate a first compressed video bit stream. The video scaler generates a reduced resolution version of the video signal from the first resolution version. The reduced resolution version is supplied to a second video compressor and to the first video compressor. The first video compressor utilizes the reduced resolution version of the video signal in performing a hierarchical motion estimation (ME) search as part of the encoding process for the first resolution version. The second video compressor encodes the reduced resolution version to generate a second compressed bit stream. The second video compressor receives motion vectors or other results of the hierarchical ME search performed in the first video compressor, and uses these results to facilitate the encoding of the reduced resolution version. The apparatus and method may be used in a non-linear video editor, a video server or other video processing system. The video scaler and first and second video compressors may share memory, a transform unit and other processing hardware such that system cost and complexity are reduced.

24 Claims, 3 Drawing Sheets

U.S. PATENT DOCUMENTS

| | | | |
|---|---|---|---|
| 5,606,369 | * | 2/1997 | Keesman et al. ............... 348/385 |
| 5,737,023 | | 4/1998 | Linzer .............................. 348/416 |
| 5,742,343 | | 4/1998 | Haskell et al. ................... 348/415 |
| 5,742,892 | | 4/1998 | Chaddha .......................... 348/398 |
| 5,821,986 | | 10/1998 | Yuan et al. ......................... 348/17 |
| 5,832,234 | | 11/1998 | Iverson et al. ................... 348/398 |
| 5,841,470 | * | 11/1998 | Welsh ............................... 348/397 |
| 5,845,088 | * | 12/1998 | Lewis ............................... 709/247 |
| 5,886,736 | * | 3/1999 | Chen .................................. 348/43 |
| 5,973,739 | * | 10/1999 | Nilsson ............................ 348/397 |
| 6,005,621 | * | 12/1999 | Linzer et al. .................... 348/398 |
| 6,023,299 | * | 2/2000 | Katata et al. .................... 348/415 |
| 6,031,572 | * | 2/2000 | Christopoulos .................. 348/397 |

OTHER PUBLICATIONS

"Architectures for MPEG Compressed Bitstream Scaling" Huifang Sun, Wilson Kwok and Joel W. Zdepski, IEEE Transactions on Circuits and Systems for Video Technology, vol. 6., No. 2, Apr., 1996, pp. 191–199.

Vincent et al., "Spatial prediction in scalable video coding", Internation Broadcasting Convention, 1995, pp. 244–249.*

Bayrakeri et al., "Temporally scalable video coding using nonlinear deinterlacing", Proceedings Data Compression Conf., Mar. 1997, pp. 423.*

Bayrakeri et al., "MPEG–2 nonlinear temporally scalable coding and hybrid quantization", IEEE ICASSP–97, Apr. 1997, vol. 4, pp. 2629–2634.*

* cited by examiner

MULTIPLE RESOLUTION VIDEO COMPRESSION

This application is a divisional of Ser. No. 08/999,763, filed Jul. 22, 1997, now U.S. Pat. No. 6,005,621.

FIELD OF THE INVENTION

The present invention relates generally to digital video compression and more particularly to video compression methods and apparatus for producing different resolution compressed versions of a given video signal.

BACKGROUND OF THE INVENTION

FIG. 1 shows an "on-line" "non-linear" video editing system 10. One or more linear video sources 12, such as video tape recorders (VTRs), each output an analog or digital video signal to a compressor 14. The compressor 14 compresses each video signal and stores the digital compressed video signals in a non-linear storage device 16, such as a magnetic disk. Unlike the linear video signal source 12, which accesses video signals sequentially, the non-linear storage device 16 supports random access of video signals. Compression of the video signals in the compressor 14 may be achieved according to the MPEG, MPEG-2, Dolby™ AC-3, etc., standards for compressing video and associated audio. See ISO/IEC IS 13818-1, 2, 3: Generic Coding of Moving Pictures and Associated Audio: Systems, Video and Audio. The compressed video signals are then edited using a computer 18 which accesses the compressed video signals for display and editing. In displaying a compressed video signal, the non-linear storage device 16 outputs a compressed video signal to a video decompressor 19, which decompresses the video signal for display on a display monitor. After editing, the edited compressed video signal may be retrieved from the non-linear storage device 16 and decompressed by decompressor 19 for storage on a linear storage device (such as a VTR) or transmitted.

The non-linear video editing system 10 enables the operator to access the video in a random fashion instead of a sequential fashion. This facilitates the editing of the video and provides for rather precise editing. The editing is said to be "on-line" in that the final edited video event is incrementally constructed as the edits are made. For example, if the operator chooses to splice a first video clip to a second video clip, then the compressed form of the first video clip is spliced to the compressed form of the second video clip, at the time the operator makes such a choice to produce an edited compressed video signal. The edited video event is formed by decompressing the edited compressed video signal.

FIG. 2 shows a an "off-line" "non-linear" video editing system 50. Multiple linear video sources 12 are used to input video signals to a video compressor 14. The video compressor 14 compresses each video signal and stores the compressed video signal on a non-linear storage device 16. As before, a computer 18 can access the compressed video signals on the non-linear storage device 16 for viewing and editing. The compressed video signals are decompressed in decompressor 19 prior to viewing on a display monitor (not shown).

Unlike the video editing system 10, the video editing system 50 does not incrementally form the final edited video event as each edit decision is made. Rather, the formation of the final edited video event is deferred until the editing of the video signals is complete. The computer 18 generates a "edit decision list" as each editing operation is performed by the operator. Each edit decision on the edit decision list may, for example, indicate the kind of edit transition/operation to use (cut, fade, wipe dissolve, over-dub, etc.), which video clips are operated on by the edit operation and the edit points (e.g., specific pictures or audio frames at which the editing operation begins and ends) within those clips. The operator can preview a "facsimile" of the final event as formed by performing the edit operations indicated on the edit decision list on the compressed video signals stored in the non-linear storage device 16. After the operator has approved the edit decisions, the computer 18 accesses the original video signals stored on the linear storage devices 12 and performs edit operations on these video signals according to the edit decision list.

Typically, an off-line video editor 50 produces a final edited video event with better video and audio quality than an on-line video editor 10. This is because the video event produced by on-line video editing contains compression artifacts produced by the lossy or imperfect compression and decompression of the video. Nevertheless, an on-line video editor 10 is less expensive than an off-line video editor 50 because the on-line video editor 10 needs only a single linear storage device 12. Furthermore, the linear storage device 12 used in the on-line video editor 10 need not be as sophisticated as the linear storage device 12 used in the off-line video editor 50 since it does not have to advance to multiple specific edit points (as would be necessary in the off-line video editor in forming the final edited video event from the edit list). The on-line video editor 10 is easier to use because the physical media (video tapes) on which the original video information is stored need not be resident in the linear storage device 12 to create the final edited video event This is because once the video signals are transferred to the non-linear storage device 16, the video signals need not be retrieved from the linear storage device again.

In order to reduce the level of compression artifacts present in the final edited video event in the on-line video editor 10, the on-line video editor 10 may typically use high compression data rates, high resolution and/or inter-frame coding. Video signals from source 12 in system 10 are compressed before being stored in the storage device 16 in order to save disk space and because the throughput of inexpensive disk drives is generally insufficient to support uncompressed high resolution video. To insure sufficiently high quality edited video, a non-lineir editor typically uses high resolutions such as 720×480 pixels at 30 frames/sec and high compressed bit rates such as 18–50 Mbits/sec.

The use of high resolutions, high bit rates and/or inter-frame encoding in the compressor 14 can increase the difficulty of processing functions such as accessing stored compressed video streams, playing back more than one bit stream at the same time, and decoding/decompressing with trick modes such as fast forward and fast reverse. A compression system which utilizes compressed video bit streams having low resolution, low bit rate and/or only intra-frame encoding does not suffer these drawbacks. It is therefore desirable in many applications to provide a system in which multiple resolution and/or multiple bit rate versions of a given video signal can be compressed and stored. The high resolutions, high bit rates and inter-frame encoding can then be utilized when necessary, while the advantages of low resolution, low bit rates and intra-frame encoding can also be provided in appropriate applications.

Video servers represent another application in which storage of multiple versions of compressed video bit streams is desirable. Such video servers are used to deliver video bit streams to end users over data communication networks. For example, a World Wide Web server may be used to deliver video bit streams to different end users over different types of lines, including plain old telephone service (POTS) lines, integrated services digital network (ISDN) lines, T1 lines and the like. A version of a given compressed bit stream that may be suitable for a POTS user would be considered poor quality by a T1 user, and a bit stream suitable for a T1 user would be at too high a bit rate for a POTS user. It is therefore desirable for the video server to store a given video bit stream at multiple bit rates. The "optimal" resolution for a compressed video bit stream is the one that yields the best subjective video quality after decompression. This optimal resolution generally decreases with bit rate, such that it is desirable for the video server to compress the different bit rate streams at different resolutions.

FIG. 3 shows a conventional video compression system 20 which generates and stores multiple resolution versions of a given bit stream. The system 20 includes a video source 12, video compressor 14 and storage device 16 which operate in the manner previously described in to conjunction with FIGS. 1 and 2. The system 20 also includes a video scaler 22 which receives a given video signal from the source 12 and generates a number of reduced resolution versions thereof These reduced resolution versions are supplied to the video compressor 14, which generates a compressed video bit stream at an appropriate bit rate for each of the reduced resolution versions of the video signal, and stores the resulting compressed streams on the storage device 16.

The system 20 suffers from a number of significant problems. For example, each of the reduced resolution versions of a given video signal are separately and independently compressed. The information used to encode the video signal at one resolution is generally not used to facilitate the encoding process for the other reduced resolution versions. In addition, the video scaler 22 and video compressor 14 are not configured in a manner which enables them to share at least a portion of a common memory. The system 20 therefore requires relatively large amounts of memory. These and other drawbacks of the system 20 unduly increase its cost and complexity, and limit its usefulness in non-linear editor applications, video server applications and numerous other important video processing applications.

As is apparent from the above, there is a need for an improved multiple resolution video compression system in which hardware and processing resources can be shared to thereby significantly reduce the cost and complexity of the system.

SUMMARY OF THE INVENTION

The present invention provides an apparatus and method for compressing multiple resolution versions of a video signal. Each of the compressed version of the video signal may be independently decompressed, i.e., without resort to information contained in another version of the video signal.

Illustratively, such multiple compressed versions of the video signal may be used in a non-linear video editing system. One compressed version of the video signal may be used to determine how to edit the video to produce a final edited video event. A second compressed version of the video signal may be used to create the final edited video event. For example, a lower quality compressed version of the video signal may be viewed and used as a basis to form an edit decision list. After the edit decision list is complete, the actual editing operations may be performed on a higher quality compressed version of the video signal to produce a final edited high quality video event.

The invention permits the sharing of memory between a video scaler and video compressor in a video compression system, and the sharing of motion estimation, discrete cosine transform and other compression hardware between multiple video compressors in the video compression system. The invention thereby considerably reduces the cost and complexity of a video compression system. The invention also significantly improves the performance and capabilities of non-linear video editors, video servers and other video processing applications which utilize multiple resolution compression systems.

An exemplary embodiment of the invention includes first and second video compressors and a video scaler. A first resolution version of a video signal is applied to an input of a first video compressor and to an input of a video scaler. The first resolution version may be a CCIR601 image sequence or other high resolution unscaled video image sequence. The first video compressor encodes the first resolution version of the video signal to generate a first compressed video bit stream in accordance with MPEG-2 or another suitable video encoding standard. The video scaler generates a reduced resolution version of the video signal from the first resolution version. The reduced resolution version may be a QQCIF image sequence, a QCIF image sequence or a CIF image sequence, the images of which are 1/64 size, 1/16 size and 1/4 size, respectively, relative to a full resolution CCIR601 image. Other types of images and image resolutions may also be used, and the video scaler may generate multiple reduced resolution versions of the video signal. The reduced resolution version or versions are supplied to a second video compressor and to the first video compressor. The first video compressor utilizes the reduced resolution versions of the video signal in performing a hierarchical motion estimation (ME) search as part of the encoding process for the first resolution version. The second video compressor encodes the reduced resolution version to generate a second compressed bit stream. The second video compressor receives motion vectors or other results of the hierarchical ME search performed in the first video compressor, and uses these results to facilitate the encoding of hie reduced resolution version. Although some sharing of encoding information may occur during the compression, each video signal is independently decompressible without resort to information contained in the other video signal.

In accordance with other aspects of the invention, the video scaler and first video compressor may share a common memory for temporary storage of reduced resolution images, and the first and second compressors may be configured to utilize common motion estimation and discrete cosine transform hardware. For example, a single discrete cosine transform unit may be shared in a time multiplexed manner between the first and second video compressors.

According to another embodiment, a nonlinear editor is provided with first and second video compressors. The first video compressor is for compressing a first version of an input video signal to produce a low quality compressed video signal. The second video compressor is for compressing a second version of the same input video signal to produce a high quality compressed video signal, having a higher quality than the low quality compressed video signal. Each of the low quality and high quality compressed video signals produced by the first and second video compressors, respectively, are independently decompressible.

Illustratively, the low and high quality compressed video signals can be achieved a number of ways such as providing different quality first and second versions of the input video signal for input to the first and second video compressors. For example, the first version may be one or more of the following: spatially scaled, temporally scaled, non-interlaced (progressive scanned or de-interlaced), or bit rate reduced, whereas the second version may be one or more of the following: full spatial resolution, full temporal resolution, interlaced, or full bit-rate. Alternatively, or in addition, the first and second video compressors can compress the first and second versions of the input video signal differently. For example, the first compressor nay use one or more of the following: a less efficient compression standard, such as MPEG-1, intra-coding only, frame prediction only, or low bit rate coding whereas the second compressor may use one or more of the following: a highly efficient compression standard, such as MPEG-2, inter and intra-coding, field and frame prediction, or high bit rate coding.

Illustratively, the non-linear video editor includes a decoder which can simultaneously present more low quality compressed video signals than high quality compressed video signals in real time. Alternatively, or in addition, the non-linear video editor includes a computer that can perform more edits/effects (e.g., cuts, wipes, fades, dissolves, trick modes, etc.) on the low quality compressed video signals than on the high quality compressed video signals.

These and other features and advantages of the present invention will become more apparent from the accompanying drawings and the following detailed description.

DETAILED DESCRIPTION OF THE INVENTION

The present invention is illustrated herein using an exemplary implementation of a multiple resolution video compression system particularly well-suited for use in applications such as "non-linear" video editors and video servers. It should be understood that the techniques of the present invention are more broadly applicable to any application in which it is desirable to generate multiple resolution versions of a given video signal. The invention is suitable for use with MPEG-2 encoding as well as other video encoding standards. The term "reduced resolution" as used herein is intended to include any version of a given video signal which has a lower resolution than an unscaled version of the given signal supplied from a video source. The reduced resolution may be a reduced luminance resolution or a reduced chrominance resolution or both.

Figure 4:
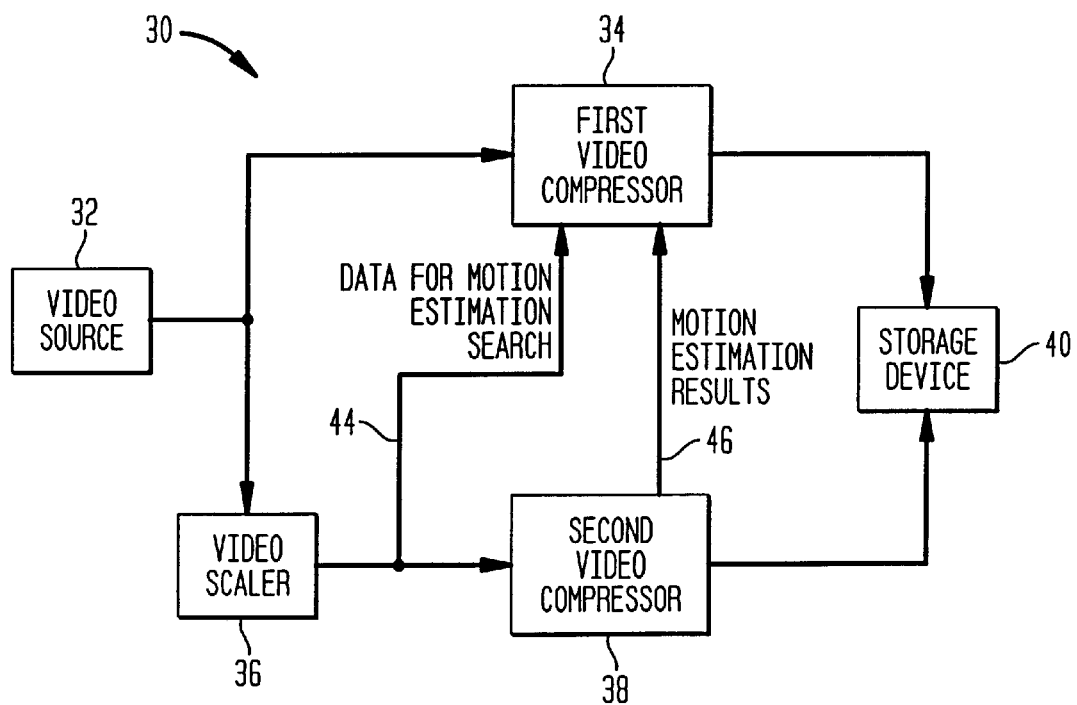
FIG. 4 shows an exemplary video compression system suitable for providing multiple resolution compression in accordance with the present invention.

FIG. 4 shows an exemplary embodiment of a multiple resolution video compression system 30 in accordance with the present invention. A video source 32 supplies a video signal to a first video compressor 34 and a video scaler 36. The video source 32 may be a single video signal source such as a video camera or video cassette recorder or a multiple-signal source made up of a combination of various sources. The video scaler 36 scales the video signal to at least one reduced resolution and sends the resulting reduced resolution version or versions to a second video compressor 38. The first video compressor 34 compresses the full resolution unscaled version of the video signal from source 32 and stores the resulting compressed video bit stream in the storage device 40. The storage device 40 may be an optical or magnetic disk drive or disk array, an electronic memory or other suitable compressed video storage device. The second video compressor 38 compresses at least one reduced resolution version of the video signal to generate at least one corresponding reduced resolution compressed video bit stream. The compressed stream or streams from the second video compressor 38 are also stored in the storage device 40. The compressed bit streams generated by the first and second video compressors 34, 38 may differ in bit rate, group of picture (GOP) structure and/or other parameters. The video scaler 36 and the video compressors 34, 38 may be combined into a single device to facilitate sharing of hardware resources as will be described in greater detail below.

Figure 5:
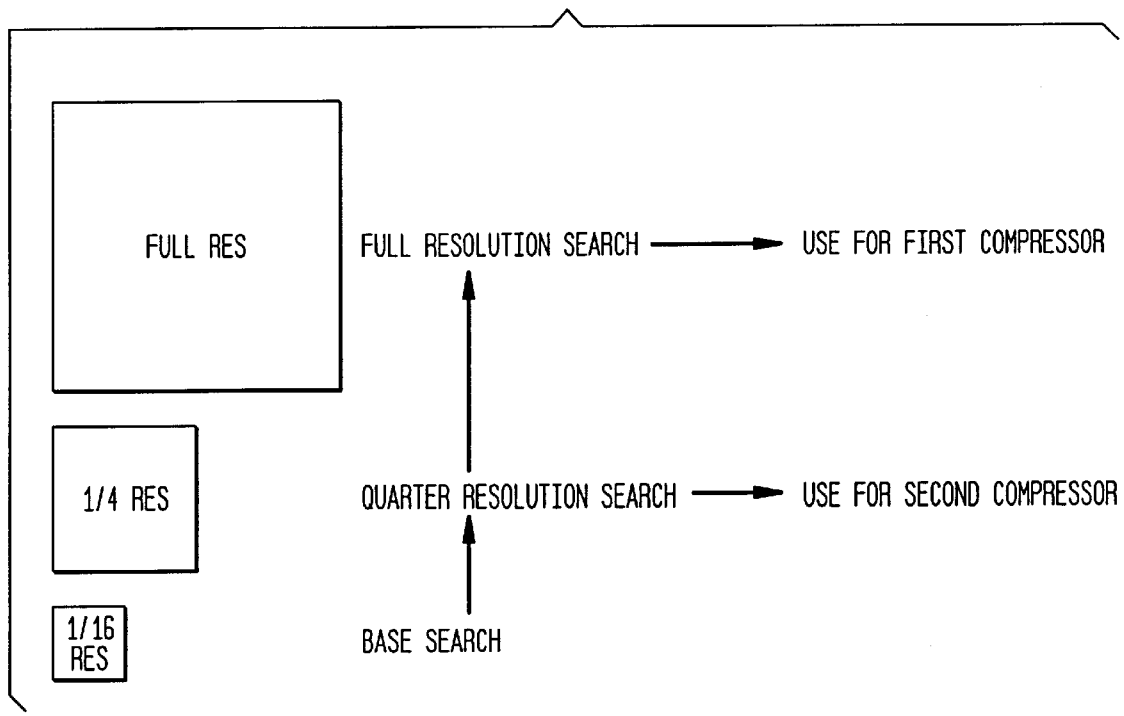
FIG. 5 shows a motion estimation strategy according to an embodiment of the present invention.

At least one reduced resolution version of the video signal is supplied from the video scaler 36 via line 44 to the first video compressor 34. The reduced resolution version is used in a hierarchical motion estimation (ME) search performed on frames of the unscaled full resolution video signal in the first video compressor 34. The scaler 36 and first video compressor 34 can therefore share at least a portion of a common memory. The first video compressor 34 performs the hierarchical ME search and generates ME search results which are supplied via line 46 to the second video compressor 38. The second video compressor 38 uses the ME search results from the first video compressor 34 in encoding the reduced resolution version supplied from the video scaler 36. For example, the second video compressor 38 may utilize an average of motion vectors supplied from the first video compressor 34 or the actual motion vectors generated by a particular hierarchical ME search stage. One way in which the second video compressor 38 can use the results of one stage of the motion estimation is shown in FIG. 5. For this example, it is assumed that the second video compressor 38 compresses video at ¼ the resolution of the first video compressor 34. The full resolution video signal is decimated to ¼ and ¹⁄₁₆ resolutions. Hierarchical motion estimation is then used in compressing the video signals. In such a motion estimation, a zero centered search is conducted on the ¹⁄₁₆ resolution image. The results of the first search are used as a basis to perform a second search on the ¼ resolution image (e.g., in the local vicinity of one or more candidate motion vectors identified in the first search). The results of the second search may then be used as a basis for performing a search on the full resolution image. The results of the second search may also be, used directly to generate motion vectors in the second video compressor 38. The results of the third search on the full resolution image are used to generate motion vectors for the first video compressor 34. The first and second compressors 34, 38 may share common video compression hardware. For example, a single discrete cosine transform (DCT) unit could be time multiplexed between the first and second compressors 34, 38. Other types of video compression hardware which could be time multiplexed or otherwise shared between first and second compressors 34, 38 include the inverse DCT, quantizer, inverse quantizer, motion compensator, run-level encoder, variable length encoder and pre-processing filters.

An exemplary hierarchical ME technique suitable for use in the system 30 of FIG. 4 is described in U.S. patent application Ser. No. 08/652,231 of John Ju filed on May 23, 1996 and entitled "Video Encoding With Multi-Stage Projection Motion Estimation," which is assigned to the present assignee and incorporated by reference herein. In accordance with that technique, the first video compressor 34 of system 30 may receive a video signal from source 32 in the form of a sequence of CCIR601 video images. For each CCIR601 image, the video scaler 36 generates first, second and third reduced resolution images which may be a QQCIF image, a QCIF image and a CIF image, respectively, which are 1/64 size, 1/16 size and 1/4 size, respectively, relative to the CCIR601 image. These reduced resolution images are supplied via line 44 to the first video compressor 34 as previously described. Alternatively, the video scaler 36 may generate only a subset of the reduced resolution versions of the signal from source 12, with the remaining reduced resolution versions generated within the first video compressor 34.

The video compressor 34 performs a first stage motion vector search on the 1/64 size QQCIF image using a (0,0) motion vector starting point and a first search range suitable for detecting global motion within the original CCIR601 image. Global motion refers generally to motion involving many objects in a given image, such as the motion produced by a panning or zooming operation. The first video compressor 34 then performs a second stage motion vector search on the 1/16 size QCIF image using the (0,0) starting point and a second smaller search range suitable for detecting local motion within the original CCIR601 image. Local motion refers generally to motion involving small and/or irregular movements of a particular object or objects in a given image. The first video compressor 34 then performs a third stage motion vector search on the 1/4 size CIF image using a starting point based on scaled versions of the motion vectors identified in the first and second stage searches, and a search range smaller than the first and second search ranges. The first video compressor 34 finally performs a fourth stage search on the original CCIR601 image or a reconstruction thereof using the motion vectors identified in the third search stage. A motion compensation type and a suitable set of motion vectors for the original CCIR601 image is determined based on the results of the fourth stage search. This motion compensation type and set of motion vectors may be supplied to the second video compressor 38 via line 46 and used in the encoding of one or more reduced resolution images. It should be noted that the present invention may utilize any of a number of other types of hierarchical ME search techniques.

The video compression system 30 of FIG. 4 is well-suited for use in video server applications. For example, a video server may utilize the first video compressor 34 to generlte a high resolution, high bit rate, inter-frame encoded version of a given video signal for delivery over relatively high bandwidth ISDN or T1 connections, while the second video compressor 38 is used to generate a low resolution, low bit rate, intra-frame encoded version of the given video signal for delivery over relatively low bandwidth POTS connections.

The video compression system 30 of FIG. 4 is also well-suited for use in non-linear video to editor applications. For example, a high resolution compressed bit stream generated by the first video compressor 34 and stored in storage device 40 could be used in the final edited video, with one or more reduced resolution bit streams generated by the second video compressor 38 used to provide trick mode playback, fast random access, multiple simultaneous stream playback and other functions which facilitate the editing process.

Figure 6:
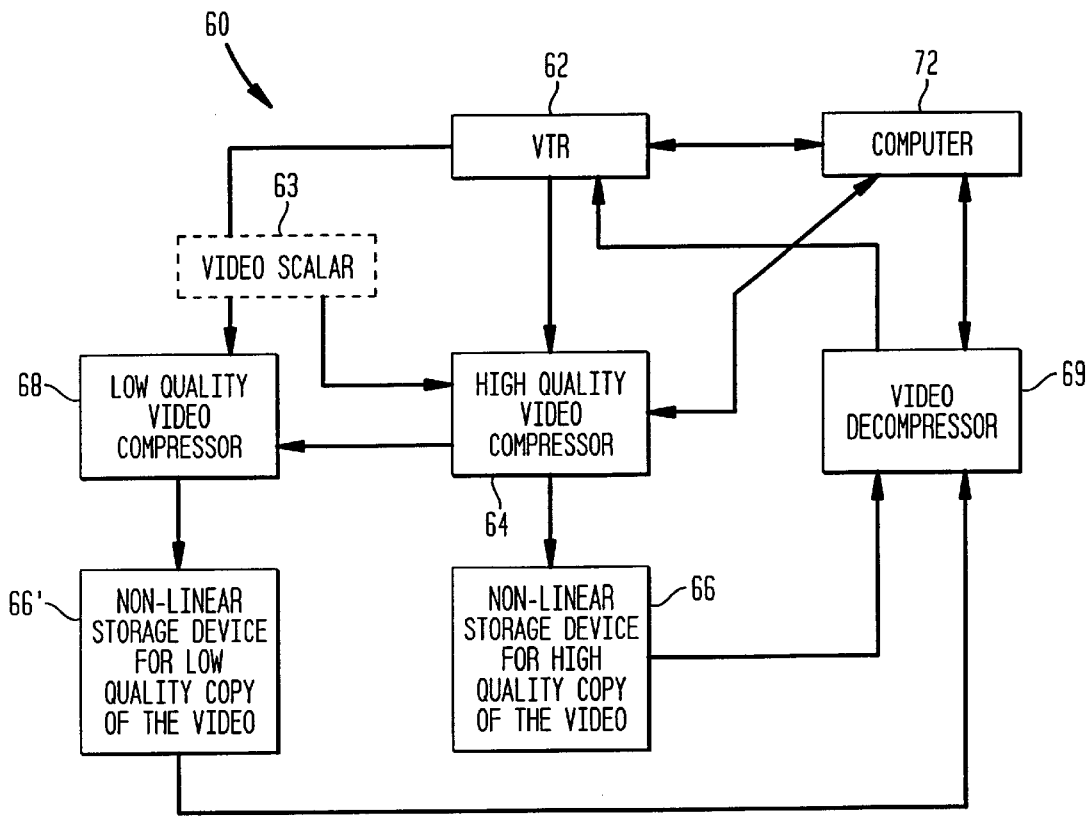
FIG. 6 shows a non-linear video editor according to an embodiment of the present invention.

FIG. 6 shows a non-linear video editing system 60 according to another embodiment of the present invention. As shown, a linear-video source 62 outputs an original video signal to a first video compressor 64 and a second video compressor 68. The first video compressor 64 produces a high quality compressed video bitstream and the second video compressor 68 produces a low quality compressed video bitstream. For purposes of this specification, a low-quality compressed bit stream is created by either compressing a version of the video signal that is of lower quality than the version of the video signal compressed by the second video compressor 68 or compressing a video signal using a less efficient compression technique. For example, the version of the video signal received at the first video compressor 64 may have a lower spatial resolution, a lower temporal resolution, or a lower bit rate, than the version of the original video signal received at the second video compressor. Likewise, the version of the original video signal received at the first video compressor 64 may be noninterlaced (i.e., progressive scanned or de-interlaced) whereas the version of the video signal received at the second video compressor 68 may be interlaced. An example of such a situation is where the version of the video signal received at the first video compressor 64 is SIF (352×240×29.97 frames per second) format and the version of the original video signal received at the second video compressor 68 is HHR (352×240×59.98 fields per second) format. Another example is where the first version of the video signal (fed to compressor 68) has a bit rate of 5 mbits/sec and where the second version of the video signal (fed to compressor 64) has a bit rate of 30 mbits/sec.

To produce a spatially or temporally scaled video bit stream for input to the first video compressor 64, the original video signal may be first scaled by scaler 63. The scaled video signal is inputted to the first video compressor 64 but the unscaled original video signal is inputted to fit the second video compressor 68. Note, then, that the use of a video scaler 63 is only illustrative of the type of device which can be used to lower the quality of the compressed video signal produced by the first video compressor 64. Video scaler 63 may be replaced with a de-interlacer, or some combination of the de-interlacer and the video scaler.

Alternatively, the video compressors 64 and 68 receive the same version of the input video signal, in which case, the video scaler 63 is absent. Rather, the video compressor 68 produces a lower quality compressed video signal because the video compressor 68 operates according to a less efficient compression standard (e.g. MPEG-1, motion JPEG, H.261, H.263), uses fewer compression options (i.e., users intra-coding only, uses frame prediction only, uses a smaller motion vector search range, etc.) or simply compresses the video to a lower bit rate than the second video compressor 64. Alternatively, the video compressors 64 and 68 both receive different quality video signals and compress the video signals using different efficiency compression techniques.

Despite these differences between the low and high quality compressed video bit stream, the compressors 64 and 68 may optionally share compression results to,improve performance. Nevertheless, each of the low quality and high quality compressed video bit streams is independently decompressible, i.e., without reliance on any information in the other compressed video bit stream. The high quality compressed version of the video signal is stored on a first non-linear storage device 66. The low quality compressed version of the video signal is stored on a second non-linear storage device 66'. Preferably, the first and second non-linear storage devices 66 and 66' are a single non-linear storage device. Also provided are a computer 72 for viewing and editing video signals and a decompressor 69 for decompressing the low and high quality compressed video signals stored in the non-linear storage devices 66 and 66'. The computer 72 in FIG. 6 may be embodied as a general purpose workstation or a general purpose work station with additional hardware for performing video effects. The video compressors 64 and 68 and decompressor 69 may be embodied as discrete integrated circuits or as a single integrated circuit. The additional hardware for performing video effects may be embodied on the same integrated circuit as the video effects may be embodied on the same integrated circuit as the video decompressor 69.

In operation, the operator views and edits the video as decompressed from the low quality compressed video signal. The operator may preview edits as performed on the low quality compressed video signal or the high quality compressed video signal. Preferably, however, the formation of the edited video event is deferred. Instead, a video edit decision list is constructed during the course of editing the video signals. After the operator is satisfied with the edit decisions, the high quality compressed video signal is edited according to the edit decision list. Afterwards, the edited video event in high quality compressed form is stored on the non-linear storage device 66. This edited video event illustratively may be decompressed by decompressor 69 and transmitted or stored using on a linear storage device such as VTR 62.

In general, the low quality compressed video signal is easier to store, retrieve, decompress and manipulate (perform edit operations on) than the high quality compressed video signal. For example, it may be easier to play back simultaneously a large number of low quality (low bit rate) bit streams, to play back such bit streams in reverse order, to play back such bit streams in fast forward or fast-reverse, etc. It is also possible that the non-linear storage device 66, computer 72 and/or decompressor 69 can only accommodate such operations/transitions on the high quality compressed video signal in non-real time. Note that it is possible to provide equipment which can support such real time operations and transitions on the high quality compressed video signal as well as the low quality compressed video signal. However, a savings can be achieved since less expensive/sophisticated non-linear storage devices 66 and 66', decompressors 69 and computers 72 can be used which need not support real-time operations/transitions on the high quality compressed video signal.

Figure 1:
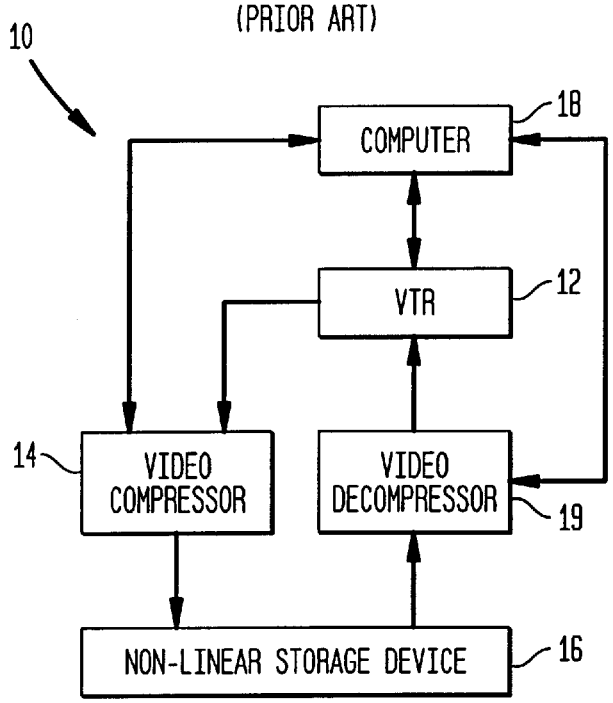
FIG. 1 shows a conventional off-line video editing system.
Figure 2:
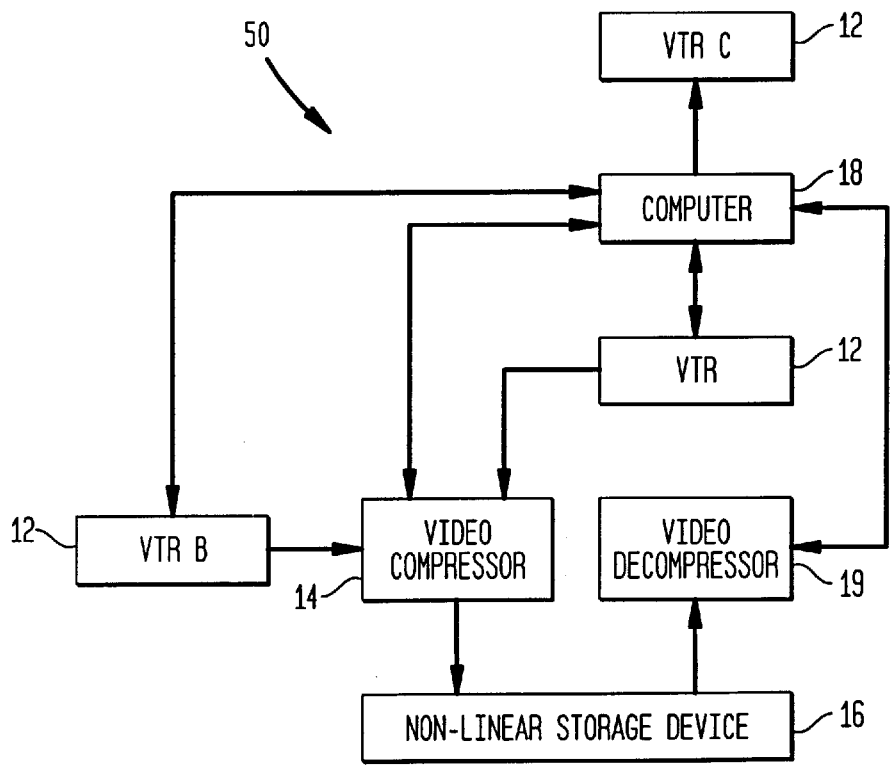
FIG. 2 shows a conventional on-line video editing system.

The video editor 60 provides several editing options not available in the conventional online video editor 10 of FIG. 1. For instance, the operator can view video clips at a fast-forward or fast-reverse speed even though the equipment (e.g., non-linear storage device 66', decompressor 69, computer 72) might only accommodate such real-time operations for the low quality compressed video signal (and therefore is substantially less costly than equipment that can also perform such operations/transitions on the high quality compressed video signal). For the same reason, the operator can use substantially less expensive equipment to view multiple clips simultaneously.

Note also that if the low quality compressed video signal uses intra-frame coding whereas a high quality compressed video signal uses both intra-frame and inter-frame coding, then reverse direction viewing of low quality clips is substantially simpler. (This is because inter-frame encoded video includes pictures that are encoded using data in preceding and/or succeeding reference pictures as predictors. Such reference pictures may be located in the bit stream of the high quality compressed video signal in a different order than the order in which they are presented or displayed to facilitate forward direction decompression and presentation. However, this reordering in the bit stream renders reverse order decompression and presentation more difficult.) Decompressors 69 which support reverse order play back of inter-frame encoded video signals are substantially more complex and expensive than decompressors that do not provide such a feature for inter-frame encoded video. Thus, the editor 60 provides a low-cost solution for accommodating real-time reverse play back of video clips (albeit, using only the low quality compressed video signal).

Furthermore, note that the operator can easily preview several complex transitions on the low quality compressed video signal to determine which produces the best results. Such complex transitions might be possible in real-time, or in any event, using less time than performing such transitions on the high quality compressed video signal. In one manner of preview, the operator performs several real-time complex transitions on the low quality compressed video signal. The operator selects a desired complex transition and performs such a transition on the high quality compressed video signal. Illustratively, the equipment can only perform the complex transition on the high quality video signal in non-real-time. The computer 72 signals the storage device 66 to retrieve the appropriate portion(s) of the high-quality video signal and signals the decompressor 69 to decompress them. If necessary, the computer 72 performs the complex transition on the decompressed video signal. The edited video signal with the complex transition thus produced is compressed (using the high quality compressor 64) and stored on the non-linear storage device 66.

More generally stated, decompressor 69 of the video editor 60 may be able to decompress, simultaneously, in real-time, N low quality compressed bit streams (for simultaneous display), but to decompress simultaneously, in real-time, only M high quality compressed bit streams (for simultaneous display), where N>M≧0. Likewise, the computer 72 and compressor 68 may be able to edit simultaneously, in particular, to simultaneously perform effects on, N low quality compressed bit streams, whereas the computer 72 and compressor 64 may be able to only edit simultaneously M high quality compressed bit streams, where N>M≧0. For example, it is possible that N=3 low quality compressed bit streams could be viewed in real-time simultaneously, but only M=1 high quality compressed bit stream can be viewed in real-time. Alternatively, it is possible to edit/perform effects on N=2 low quality compressed bit streams in real-time, e.g., a dissolve of one low quality compressed bit stream into another, yet only be able to perform such effects on the high quality compressed bit stream in non-real-time. In yet another embodiment, the editor 60 can perform effects on N=3 low quality compressed bit streams in real-time, such as a dissolve of one low quality compressed bit stream into a second low quality compressed bit stream, with a third low quality compressed bit stream in a small "picture-in-picture" box. However, the editor 60 might only be able to perform, effects on M=2 high quality compressed bit streams in real-time, e.g., the dissolve of a first high quality compressed bitstream into a second high quality compressed bitstream, but not simultaneously also provide a third high quality compressed bit stream in a picture-in-picture box. Each of these embodiments is desirable since more effects would be necessary for previewing, in low quality, edits/effects before finalizing, and performing, the finalized edit/effect in high quality.

The description of the architecture above assumes that the equipment (e.g., decompressor 69, non-linear storage devices 66 and 66' and computer 72) support full real time operations/transitions on low quality compressed video signals but only non-real time transitions/operations on the high quality compressed video signals. Of course, the same architecture can be used with more expensive equipment that can support all transitions/operations on the high quality compressed video signal.

Figure 3:
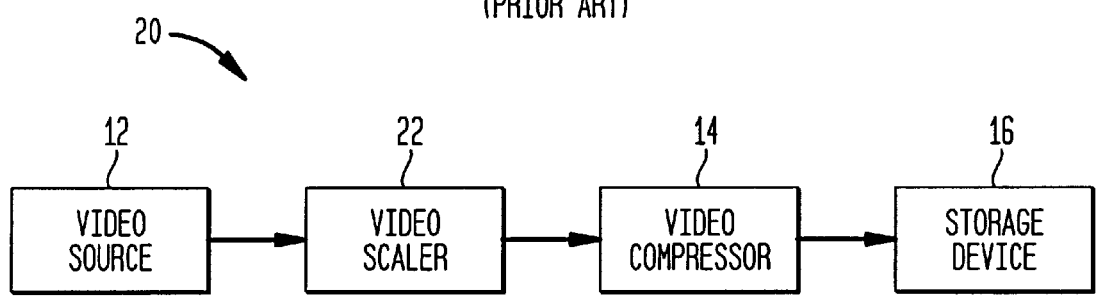
FIG. 3 shows a conventional video compression system.

The foregoing description is merely illustrative of the invention. Those having ordinary skill in the art may devise numerous alternative embodiments within the scope of the appended claims. For example, alternative embodiments of the invention may utilize any number of additional video sources 32, video scalers 36 and video compressors 34, 38 arranged to process any number of video signals to generate any number of corresponding compressed video bit streams. The compressed bit streams may be stored on a single storage device 40 as shown in FIG. 3 or on multiple storage devices.

The claimed invention is:

1. A nonlinear editor comprising:
   a first video compressor for compressing a first version of an input video signal to produce a low quality compressed video signal, and
   a second video compressor for compressing a second version of said input video signal to produce a high quality compressed video signal, said high quality compressed video signal having a higher quality than said low quality compressed video signal,
   wherein each of said low quality and high quality compressed video signals produced by said first and second video compressors, respectively, are independently decompressible,
   wherein said first version of said video signal is noninterlaced and said second version of said video signal is interlaced.

2. The editor of claim 1 further comprising:
   a video scaler receiving said second version of said input video signal and producing said first version of said video signal, said first version of said video signal having a lower spatial resolution as said second video signal.

3. The editor of claim 1 wherein said first compressor compresses said first version of said input video signal using a different compression standard as used by said second compressor in compressing said second version of said input video signal.

4. The editor of claim 1 wherein said first compressor compresses said first version of said input video signal at a lower bit rate than said second compressor compresses said second version of said input video signal.

5. A nonlinear editor comprising:
   a first video compressor for compressing a first version of an input video signal to produce a low quality compressed video signal,
   a second video compessor for compressing a second version of said input video signal to produce a high quality compressed video signal, said high guality compressed video signal having a higher quality than said low quality compressed video signal, and
   a de-interlacer receiving said second version of said input video signal and producing said first version of said input video signal, said first version of said video signal comprising frames formed from fields of said second version of said input video signal,
   wherein each of said low quality and high qualily compressed video signals produced by said first and second video compressors, respectively, are independently decompressible.

6. A nonlinear editor comprising:
   a first video compressor for compressing a first version of an input video signal to produce a low quality compressed video signal, and
   a second video compressor for compressing a second version of said input video signal to produce a high quality compressed video signal, said high quality compressed video signal having higher quality than said low guality compressed video signal,
   wherein each of said low quality and high quality compressed video signals produced by said first and second video compressors, respectively, are independently decompressible,
   wherein said first compressor compresses said first version of said input video signal using a different compression standard as used by said second compressor in compressing said second version of said input video signal, and
   wherein said first and second versions of said input video signal are identical.

7. A nonlinear editor comprising:
   a first video compressor for compressing a first version of an input video signal to produce a low quality compressed video signal, and
   a second video compressor for compressing a second version of said input video signal to produce a high guality compressed video signal, said high quality compressed video signal having a higher quality than said low quality compressed video signal,
   wherein each of said low quality and high quality compressed video signals produced by said first and second video compressors, respectively, are independently decompressible, and
   wherein said first video compressor compresses said first version of said input video signal using only intra coding and wherein said second compressor compresses said second version of said input video signal using both intra coding and inter coding.

8. A nonlinear editor comprising:
   a first video compressor for compressing a first version of an input video signal to produce a low quality compressed video signal,
   a second video compressor for compressing a second version of said input video signal to produce a high quality compressed video signal, said high quality compressed video signal having a higher quality than said low quality compressed video signal, and
   a decoder capable of simultaneously presenting N of said low quality compressed video signals in real time and capable of simultaneously presenting M of said high quality compressed video signals in real time, where N>M>=0,
   wherein each of said low quality and high quality compressed video signals produced by said first and second video compressors, respectively, are independently decompressible.

9. The editor of claim 8 further comprising:
   a computer for enabling construction of an edit decision list for editing one or more of said M high quality compressed video signals based on said presentation of said N low quality compressed video signals.

10. The editor of claim 9 wherein said computer edits said one or more high quality compressed video signals according to said edit decision list.

11. A nonlinear editor comprising:
a first video compressor for compressing a first version of an input video signal to produce a low quality compressed video signal,
a second video compressor for compressing a second version of said input video signal to produce a high quality compressed video signal, said high quality compressed video signal having a higher quality than said low quality compressed video signal, and
a computer capable of performing effects on N decoded ones of said low quality video signals in real time and capable of performing effects on M decoded ones of said high quality video signals in real time, where N>M>=0,
wherein each of said low quality and high quality compressed video signals produced by said first and second video compressors, respectively, are independently decompressible.

12. The editor of claim 11 wherein said computer constructs an edit decision list based on effects performed on up to N of said decoded low quality video signals and performs effects from said edit decision list on up to M of said decoded high quality video signals.

13. A method for editing a video signal comprising the steps of:
compressing a first version of an input video signal to produce a low quality compressed video signal, and
compressing a second version of said input video signal to produce a high quality compressed video signal, said high quality compressed video signal having a higher quality a said low quality compressed video signal,
wherein each of said low quality and high quality compressed video signals produced by said steps of compressing are independently decompressible, and
wherein said first version of said video signal is noninterlaced and said version of said video signal is interlaced.

14. The method of editing of claim 13 further comprising:
scaling said second version of said input video signal to produce said first version of said video signal so that said first version of said video signal has a lower resolution as said second video signal.

15. The method of editing of claim 13 further comprising:
compressing said first version of said input video signal using a different compression standard as used to compress said second version of said input signal.

16. The method of editing of claim 13 wherein said low quality compressed video signal has a lower bit rate than said high quality compressed video signal.

17. A method for editing a video signal comprising the steps of:
compressing a first version of an input video signal to produce a low quality compressed video signal,
compressing a second version of said input video signal to produce a high quality compressed video signal, said high quality compressed video signal having a higher quality than said low quality compressed video signal, and
de-interlacing said second version of said input video signal to produce said first version of said input video signal so that said first version of said video signal comprises frames formed from fields of said second version of said input video signal,
wherein each of said low quality and high quality compressed video signals produced by said steps of compressing are independently decompressible.

18. A method for editing a video signal comprising the steps of:
compressing a first version of an input video signal to produce a low quality compressed video signal, and
compressing a second version of said input video signal to produce a high quality compressed video signal, said high guality compressed video signal having a higher quality than said low quality compressed video signal,
wherein each of said low quality and high quality compressed video signal produced by said steps of compressing are independently decompressible, and
wherein said first and second versions of said input video signal are identical.

19. A method for editing a video signal comprising the steps of:
compressing a first version of an input video signal to produce a low quality compressed video signal,
compressing a second version of said input video signal to produce a high quality compressed video signal, said high qualily compressed video signal having a high quality than said low quality compressed video signal,
compressing said first version of said input video signal using only intra coding, and
compressing said second version of said input video signal using both intra coding and inter coding,
wherein each of said low quality and high quality compressed video signals produced by said steps of compressing are independently decompressible.

20. A method for editing a video signal comprising the steps of:
compressing a first version of an input video signal to produce a low quality compressed video signal,
compressing a second version of said input video signal to produce a high quality compressed video signal, said high quality compressed video signal having a higher quality than said low quality compressed video signal,
simultaneously presenting N of said low quality compressed video signals in real time, and
simultaneously presenting M of said high quality compressed video signals in real time, where N>M>=0,
wherein each of said low quality and high quality compressed video signals produced by said steps of compressing are independently decompressible.

21. A method for editing a video signal comprising the steps of:
compressing a first version of an input video signal to produce a low quality compressed video signal,
compressing a second version of said input video signal to produce a high quality compressed video signal, said high quality compressed video signal having a higher quality than said low quality compressed video signal, and
performing effects on N decoded ones of said low quality video signals in real time and performing effects on M decoded ones of said high quality video signals in real time, where N>M>=0,
wherein each of aid low quality and high quality compressed video signals produced by said steps of compressing are independently decompressible.

22. A method for editing a video signal comprising the steps of:
compressing a first version of an input video signal to use a low quality compressed video signal,
compressing a second version of said input video signal to produce a high quality compressed video signal, said high quality compressed video signal having a higher quality than said low quality compressed video signal, and constructing an edit decision list based on effects performed on up to N of said decoded low quality video signals and performing said same effects on up to N of said decoded high quality video signals, wherein each of said low quality and high quality compressed video signals produced by said steps of compressing are independently decompressible.

23. A method for editing a video signal comprising the steps of:

compressing a first version of an input video signal to produce a low quality compressed video signal, compressing a second version of said input video signal to produce a high quality compressed video signal, said high quality compressed video signal having a higher quality than said low quality compressed video signal, and enabling construction of an edit decision list for editing one or more of said M high quality compressed video signals based on said presentation of said low quality compressed video signals, wherein each of said low quality and high quality compressed video signals produced by said steps of compressing are independently decompressible.

24. The method of editing of claim 23 further comprising the step of:

editing said one or more high quality compressed video signals according to said edit decision list.

* * * * *